(12) United States Patent
Pang et al.

(10) Patent No.: US 10,769,399 B2
(45) Date of Patent: Sep. 8, 2020

(54) METHOD FOR IMPROPER PRODUCT BARCODE DETECTION

(71) Applicant: Zebra Technologies Corporation, Lincolnshire, IL (US)

(72) Inventors: Robert James Pang, Manorville, NY (US); Sajan Wilfred, Kollam (IN); Christopher J. Fjellstad, Smithtown, NY (US); Przemyslaw Kowalewski, Rocky Point, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/224,471

(22) Filed: Dec. 18, 2018

(65) Prior Publication Data

US 2020/0193112 A1 Jun. 18, 2020

(51) Int. Cl.
*G06K 7/14* (2006.01)
*G06K 7/10* (2006.01)
*G06N 3/08* (2006.01)

(52) U.S. Cl.
CPC ....... *G06K 7/1439* (2013.01); *G06K 7/10722* (2013.01); *G06K 7/1413* (2013.01); *G06N 3/08* (2013.01)

(58) Field of Classification Search
CPC .. G06K 7/10722; G06K 7/10772; G06K 7/10; G06K 7/14; G06K 7/1478

USPC ............... 235/462.41, 462.11, 462.24, 375
See application file for complete search history.

(56) References Cited

U.S. PATENT DOCUMENTS

| | | | |
|---|---|---|---|
| 2004/0156535 A1* | 8/2004 | Goldberg | G03D 15/001 382/115 |
| 2016/0364634 A1 | 12/2016 | Davis et al. | |
| 2017/0076269 A1* | 3/2017 | Saeed | G06Q 20/3224 |
| 2017/0200296 A1 | 7/2017 | Jones et al. | |
| 2017/0323376 A1 | 11/2017 | Glaser et al. | |
| 2019/0122024 A1* | 4/2019 | Schwartz | G06K 9/00087 |
| 2019/0197466 A1* | 6/2019 | Hand, III | G06Q 10/087 |
| 2019/0370450 A1* | 12/2019 | Fletcher | G06F 21/32 |

OTHER PUBLICATIONS

International Search Report and Written Opinion for International Application No. PCT/US2019/056467 dated Jan. 14, 2020.

* cited by examiner

*Primary Examiner* — Edwyn Labaze
(74) *Attorney, Agent, or Firm* — Yuri Astvatsaturov

(57) ABSTRACT

Techniques are provided for detecting an improper barcode using a neural network trained to identify an object from physical features appearing in images of object, and without resorting to using a barcode or other indicia to identify the object. The neural network is self-training, updating itself with selected images obtained at a Point-of-Sale. That is, the neural network is capable of training itself while performing improper barcode detection operations, such as spoofing detection.

17 Claims, 8 Drawing Sheets

METHOD FOR IMPROPER PRODUCT BARCODE DETECTION

BACKGROUND OF THE INVENTION

In many retail environments an unscrupulous individual can replace or overlay a Universal Product Code (UPC) barcode label on an expensive product with a UPC barcode label from a less expensive product. Sometimes individuals remove barcode labels off the less product and overlay it; yet, other times individuals bring pre-printed barcode labels from the outside. This practice is called spoofing. And, if a retailer does not catch the spoofing attempt, then the retailer is then denied both the cash difference between the higher cost and the lower cost item, as well as the ability to accurately know and track the inventory levels of both products.

Accordingly, there is a need for better techniques for detecting improper product barcodes.

Moreover, the UPC barcode is just one type of product identifier and it's not a self-identifying feature of the product, per se. Instead, UPC barcodes are assigned identifiers, assigned to already known and already otherwise, identified products. There is a further need for techniques for improper product detection more generally. More specifically, for example, there is a need for techniques that can detect against improper product barcode detection, and do so without needing to check actual barcodes on products.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
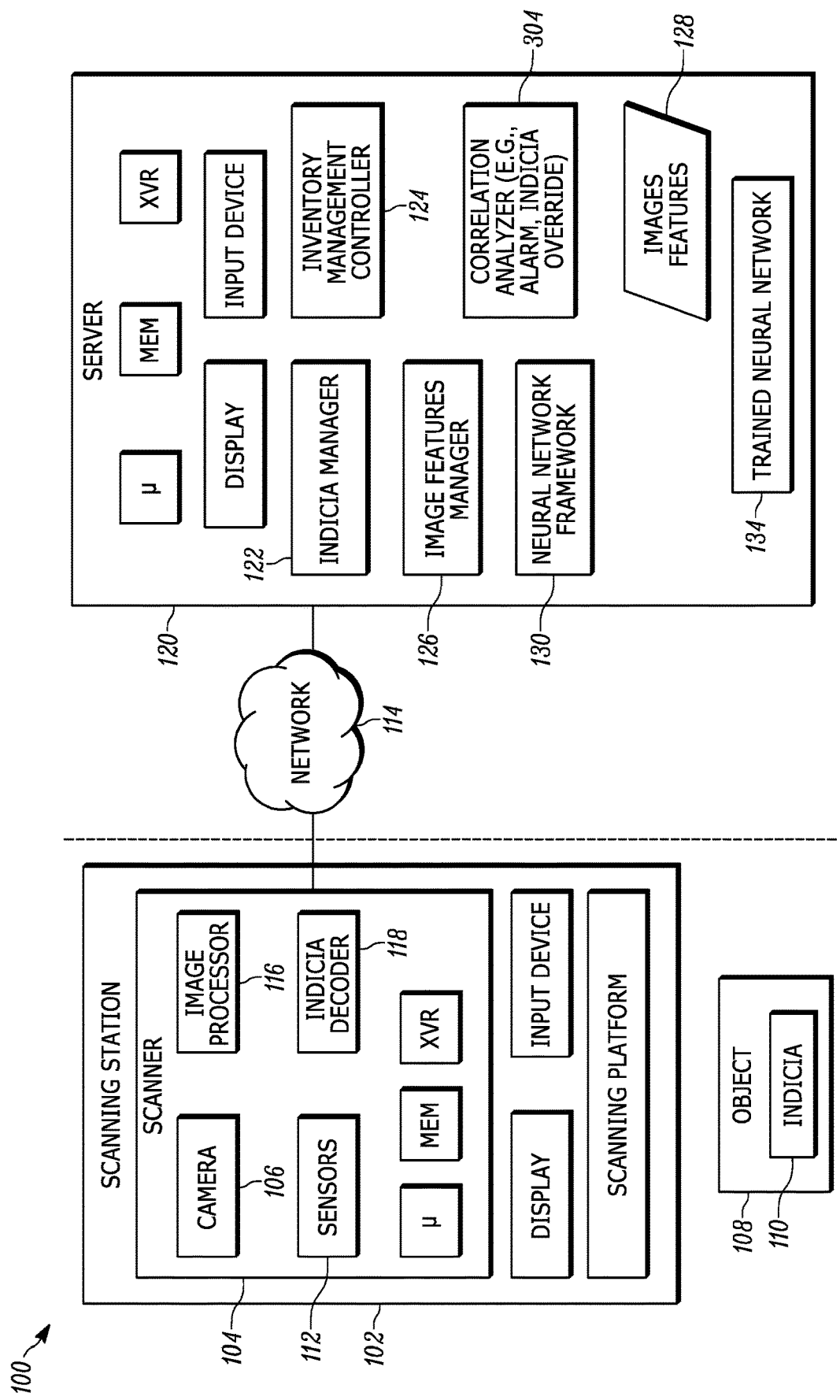
FIG. 1 is a block diagram schematic of a system having a training mode for training a neural network and a spoofing detection mode for detecting an authorization transaction attempt, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

The present invention provides techniques for training neural networks for improper object detection. The techniques can protect against spoofing attempts and other barcode scanning scams, in which individuals try to pass one object for another, less valued object. In some examples, the techniques can protect against spoofing attempts by examining products without need of examining barcode or other indicia information for the products. In some examples, the techniques can protect against spoofing by examining only physical features obtained from images of a product, for example. In yet some examples, spoofing may be determined by examining images of a product for indicia identifying a product as well as physical features of an product. For example, barcode data, once scanned and analyzed, can be compared against the physical features obtained for an object, and the data can be compared to determine if the two types of data correspond to the same object.

In various embodiments, the present invention is a method for using a neural network for improper object detection. The method, which is a computer-implemented method implemented on one or more processors, may include receiving, at one or more processors, one or more images of the object. That image may be of an object, such as a product or package presented at a point of sale, distribution location, shipping location, etc. The image may be collected by an imaging device such as a barcode scanner with imaging reader, for example, or an imaging reader with a radio-frequency identification (RFID) tag reader. The image may be captured by a video camera or still frame camera. The image may be captured by an overhead imaging device, such as in retail locations. Further, multiple images may be captured of an object, from a single or multiple imaging devices. In some examples, image may contain at least one indicia corresponding to the object as well physical features of the object. The indicia may be a barcode, a universal product code, a quick read code, or combinations thereof, for example.

In examples, the method includes identifying, at the one or more processors, physical features of the object from the image and providing the image with identified physical features to a trained neural network. In examples, the trained neural network identifies and analyzes physical features of the object and determines an object identification data associated with the object based on the physical features. The method further includes determining a confidence level indication corresponding to the certainty of that object identification data determined by the trained neural network. When the confidence level indication is in a first range of values, the method may communicate an authorization signal having the object identification data. When the confidence level indication is in the first range of values, the method may additionally update the trained neural network with the image. When the confidence level indication is in a second range of values, the method may communicate a failed authorization signal.

The neural network may be continually trained during the classification process, as opposed to being trained separately from classification. For example, the method may include receiving the image and receiving initial object identification data. That initial object identification data may be determined from received decoded indicia data, for example. The method may determine if the initial object identification data corresponds to a lower priority object, e.g., using an object priority heuristic. When the initial object identification data corresponds to the lower priority object, the method may exclude the received image from being used to update the trained neural network. When the initial object identification data does not correspond to the lower priority object, the method provides the image to the trained neural network for updating the same.

The method may include training a neural network to identify particular objects of interest, such as, for example, low cost products often used in spoofing attempts. The method may include receiving a plurality of images of objects and performing physical feature extraction on those images. Where those objects are labeled, for example, where the images of the objects also contain images of indicia identifying the objects or where image scan data that includes decoded indicia data is received along with the image, then a neural network framework identifies physical features on the object and builds a classifier neural network of those physical features. That classifier network may then be used to analyze subsequent images to determine if those images contain the same physical features thereby confirming that those subsequent images are images of the same object. As the physical features are identified and as the neural network is trained, the method determines a confidence level corresponding to the object, where the confidence level is an indication of the accuracy by which the trained neural network can identify the object in subsequent images. As increasing numbers of images of the object are provided to the neural network framework, e.g., as more and more purchases of the object are completed at a retail location, the confidence level for identifying the object increases. Further, the method increases the confidence level by increasing the diversity images of the object. For example, the physical features of an object may comprise shape of the object, size of the object, and/or color of the object, images and text on the object. And images of the object may vary from one another in terms of object orientation (tilt, pan, and illumination conditions for the object (intensity, ambient light temperature, etc.), amount of zoom of the object, and the amount of discernible detail in the object. In some examples, the method includes generation multiple renditions of an image of an object to generate diversity images. For example, a received image may be transformed using a skew transformation, a rotation transformation, a blurring transformation, a color transformation, darkness/brightness transform, addition of noise, and/or a crumble or squeeze transform.

In some examples, the method employs a trained neural network in the form of a convolutional neural network (CNN). The CNN may be self-trained to improve over a period of time as it is trained with more images of the product.

In some examples, certain types of images are excluded from self-training of the CNN. In some examples, the method includes using images from particular imaging devices (such as, imaging devices at store-operator manned lanes) as producing trusted images used for training. In some examples, the method includes learning and adapting to changes in physical features of objects, as compared to previously identified physical features, for example, as objects change over time or seasonally.

The neural networks trained based on images from one location may be used to assess images captured at different locations (e.g., within a retail environment or at different retail environments), applying the same confidence level assessments at each location. In some examples, trained neural networks from different locations may be combined to assess subsequent images.

In this way, in various examples, methods are provided for training a neural network to be able to identify and authenticate an object based on physical features of the object with a high degree of certainty, and without examining indicia data. The identification of an object based on these physical features may then be compared against a second identification, for example, one performed based on a scanned indicia data. These two identifications may be compared against each to provide a multi-factor authentication of the scanned object for identifying improper scans, such as spoofing attempts at a point of sale.

In examples, the present invention includes a system for detecting spoofing by applying the foregoing methods and other techniques herein.

FIG. 1 illustrates an exemplary environment where embodiments of the present invention may be implemented. In the present example, the environment is provided in the form of a facility having a scanning location 100 where various goods may be scanned for training a neural network during a training mode and/or for scanning objects for purchase by a customer during a scanning authentication mode. In an example, the scanning authentication mode is a spoofing detection mode.

In the illustrated example, the location 100 is a point of sale location and includes a scanning station 102 having a scanner platform 103, e.g., a vertical and/or horizontal surface, and an object scanner 104 that includes an imaging device 106 (e.g., a camera 106) and one or more sensors 108. The scanner 104 may be a handheld scanner, hands-free scanner, or multi-plane scanner such as a bioptic scanner, for example. The camera 106 captures images of an object 108 bearing an indicia 110, where in some examples, the camera 106 is a 1D, 2D or 3D image scanner capable of scanning the object 108. In some examples, the scanner 104 may be a barcode image scanner capable of scanning a 1D barcode, QR code, 3D barcode, or other types of the indicia 110, as well as capturing images of the object 108 itself. In the illustrated example, the scanning station 104 includes sensors 112, which may include an RFID transponder for capturing indicia data is the form of an electromagnetic signal captured from the indicia 110 when the indicia 110 is an RFID tag, instead of an visual indicia, such as a barcode.

The scanner 104 also includes an image processor 116 and an indicia decoder 118. The image processor 116 may be configured to analyze captured images of the object 108 and perform preliminary image processing, e.g., before images and image scan data is sent to a server 120. In some embodiments, the image processor 116 identifies the indicia 110 captured in an image, e.g., by performing edge detection and/or pattern recognition, and the indicia decoder 118 decodes the indicia and generates identification data for the indicia 110. The scanner 104 includes that identification data in the image scan data sent.

In exemplary embodiments, the image processor 116 may be configured to identify physical features of the object 108 captured by the camera 106. Example physical features include the peripheral shape of the object, the approximate size of the object, a size of the packaging portion of the object, a size of the product within the packaging (e.g., in the case of a packaged meat or produce), a relative size difference between a size of the product and a size of the packaging, a color of the object, packaging, and/or good, images on the object, text on the object, Point-of-Sale lane and store ID from where the item was scanned, shape of product, weight of product, variety of the product especially for fruits, and freshness of the product.

In exemplary embodiments, the image processor 116 identifies physical features of the object 108 in the image(s) captured by the camera 106 by performing imaging processing. For example, for each image captured, the image processor 116 may perform initial image processing, for example, to improve image clarity and contrast, to reduce image noise and increase the signal-to-noise ratio, etc. The image processor 116 may further perform initial object detection processing, such as edge detection to identify the periphery of the object, to identify a general location of the object in the image, or other object data that may be used by a neural network.

The scanner 104 includes one or more processors ("μ") and one or more memories ("MEM"), storing instructions for execution by the one or more processors for performing various operations described herein. The scanner 104 further includes transceiver ("XVR") for communicating image scan data, etc. over a wireless and/or wired network 114 to an anti-spoofing server 120. The transceiver may include a Wi-Fi transceiver for communicating with an image processing and anti-spoofing server 120, in accordance with an example. In some examples, the scanner 104 may be wearable device and include a Bluetooth transceiver, or other communication transceiver. The scanning station 102 further includes display for displaying scanned product information to a sales clerk, customer, or other user. The scanning station 102 may further include an input device for receiving further instructions from the user.

In exemplary embodiments, the image processing and anti-spoofing server 120 is configured to receive images (and optionally image scan data, such as decoded indicia data) from the scanning scanner 104 and train a neural network to identify and classify objects in the images and perform spoofing detection or other improper product barcode detection.

The server 120 includes one or more processors ("μ") and one or memories ("MEM"), storing instructions for execution by the one or more processors for performing various operations described herein. The server 120 includes a transceiver ("XVR") for communicating data to and from the scanning station 102 over the network 114, using a communication protocol, such as WiFi.

In examples, where the server 120 is to receive data on the indicia 110, the server 120 includes an indicia manager 122, which may capture identification data from received image scan data and communicate that captured data to an inventory management controller 124 for identifying product data associated with the decoded indicia 110. In examples, where the image scan data does not include decoded identification data, the indicia manager 122 may perform the indicia decoding operations, described above as performed by the scanner 104. In other examples, one or more of the processes associated with indicia decoding may be distributed across the scanner 104 and the server 120.

The inventory management controller 124 takes the received identification data and identifies characteristic data (also termed herein product data) corresponding the indicia 110 and therefore corresponding to the object 108. Such characteristic data may include object name, SKU number, object type, object cost, physical characteristics of the object, and other information.

The present techniques, however, are able to identify an object, without use of image scan data, that is, without the use of indicia data identifying the objection. Instead, the server 120 includes an imaging features manager 126 receives the images from the scanner 104 and performs image processing to identify one or more physical features of the object 108, such as the peripheral shape of the object, the approximate size of the object, a size of the packaging portion of the object, a size of the product within the packaging (e.g., in the case of a packaged meat or produce), a relative size difference between a size of the product and a size of the packaging, a color of the object, packaging, and/or good, images on the object, text on the object, Point-of-Sale lane and store ID from where the item was scanned, shape of product, weight of product, variety of the product especially for fruits, and freshness of the product. In other examples, the physical features may be determined wholly or partly at the image processor 116 and transmitted within the image scan data from the scanner 104 to the server 120. In some examples, the image features manager works in conjunction with a neural network framework 130. In some examples, the image features manager 126 may be part of or work in conjunction with the neural network framework 130. For example, when a image feature manager works in conjunction with a neural network framework, such as a convolutional neural network, distinguishing features of each object or product are derived by one or more convolutional layers of the neural network at the time of training.

In the exemplary embodiment, the imaging features manager 126 stores captured physical features of objects in an imaging features dataset 128. In some examples, the dataset 128 stores previously identified physical features, weighting factors for physical features, and correlation data for physical features, as discussed in further detail herein.

In exemplary embodiments, the indicia manager 122 and the imaging features manager 126 are coupled to a neural network framework 130. The neural network framework 130 analyzes physical features of objects and then builds a trained neural network 134 that is used for identifying the object in subsequent images. The neural network framework 130 is then able to determine object identification data associated for the object based entirely on these physical features, without resorting to other information, such as indicial data. As new images are received at the server 120, the neural network framework 130 identifies physical features in the images, determines objective identification data identifying the object determined to be in those images, where that object identification data may be used to prevent spoofing. The neural network framework 130 may additionally use those received images to further train the trained neural network 134.

In exemplary embodiments, the neural network framework 130 analyzes the received images, determines the object identification data, and further determines a confidence level indication corresponding to the certainty of the object identification data determined by the trained neural network. The confidence level indication, for example, may vary with the quality of the received images, the zoom level of the object within those received images, with the ambient light temperature in the received images, the contrast level in the received images, the amount of the object actually appearing in the received images, etc. The neural network framework 130, for example, performs physical feature extraction on received images and compares those the extracted physical features to those of the trained neural network 134, which the higher the correlation, the greater the confidence level indication.

In exemplary embodiments, the neural network framework 130 is configured such that when the confidence level indication is in a first range of values, the server 120 communicates an authorization signal having the object identification data, and when the confidence level indication is in a second range of values, the server 120 communicates a failed authorization signal. Further, the neural network framework 130 may update the trained neural network 134 using images only when the confidence level indication is in the first range of values.

In some examples, the neural network framework 130 is configured to analyze physical features and weigh the different features providing a relative indication of how strong the physical features predicts the presence of an object in an image. Physical features with higher weights are more likely correlating to a particular object (and therefore indicating the likely presence of that object in future image scan data), than physical features with lower weights. The neural network framework 130, for example, may be configured as a convolution neural network employing a multiple layer classifier to assess each of the identified physical features and to determine respective weights for each. Weight values for the physical features may be stored as part of the trained neural network 134.

In exemplary embodiments, the neural network framework 130 is configured to develop the trained neural network 134 to identify only a subset of objects that may be imaged in a location. For example, spoofing typically occurs by using only lower cost items in a retail location. Therefore, a neural network trained to identify only lower cost items may provide sufficient protection for many retailers.

As described herein, the present techniques deploy a trained prediction model to assess received images of an object (with or without indicia) and classifier those images to determine a product associated with the object and product identification data, which is then used to prevent fraud attempts, such as spoofing. In some various examples herein, that prediction model is trained using a neural network, and as such that prediction model is referred to herein as a "neural network" or "trained neural network." The neural network herein may be configured in a variety of ways. In some examples, the neural network may be a deep neural network and/or a convolutional neural network (CNN). In some examples, the neural network may be a distributed and scalable neural network. The neural network may be customized in a variety of manners, including providing a specific top layer such as but not limited to a logistics regression top layer. A convolutional neural network can be considered as a neural network that contains sets of nodes with tied parameters. A deep convolutional neural network can be considered as having a stacked structure with a plurality of layers. In examples herein, the neural network is described as having multiple layers, i.e., multiple stacked layers, however any suitable configuration of neural network may be used.

CNNs, for example, are a machine learning type of predictive model that are particularly using for image recognition and classification. In the exemplary embodiments herein, for example, CNNs can operate on 2D or 3D images, where, for example, such images are represented as a matrix of pixel values within the image scan data. As described, the neural network (e.g., the CNNs) can be used to determine one or more classifications for a given image by passing the image through the series of computational operational layers. By training and utilizing theses various layers, the CNN model can determine a probability that an image or physical image features belongs to a particular class. Trained CNN models can be persisted for restoration and use, and refined by further training. Trained models can reside on any in-premise computer volatile or non-volatile storage mediums such as RAM, flash storage, hard disk or similar storage hosted on cloud servers.

Figure 2:
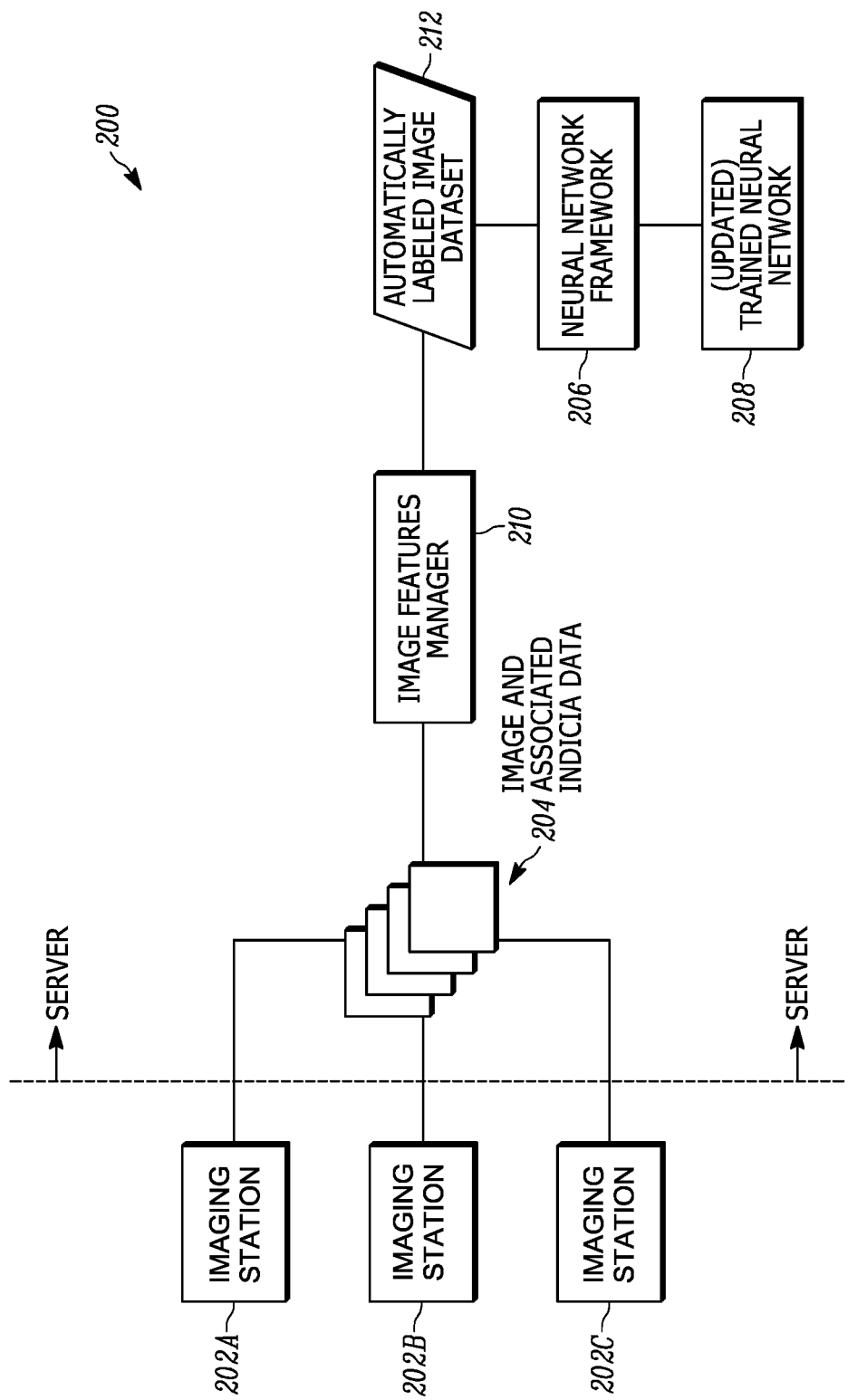
FIG. 2 is a schematic of an example training of a neural network for spoofing detection, in accordance with an example.

FIG. 2 illustrates a schematic 200 of training of a neural network. A plurality of imaging stations 202A-202C each capturing images of objects, performing preliminary image processing on those images, identify and decode indicia captured in the images of the objects, and packaging the images and associated indicia data (e.g., contained in image scan data) collectively as training image data 204. Each of the imaging station 202A-202C may represent a scanning station of having scanner, such as scanner 104. The imaging stations 202A-202C may represent any type of imaging device, include overhead video cameras. The imaging stations 202A-202C may be deployed at the same facility, such as a single retail store or warehouse, while in other examples the imaging stations 202A-202C may each be at a different facility located in a different location.

Multiple imaging station 202A-202C may capture images of the same object. For example, imaging station 202A may be a barcode scanner at a Point-of-Sale location in a retail store, while imaging station 202B may be an overhead video camera pointing to that Point-of-Sale location. For example, in some examples, no matter where the imaging station is, the imaging station captures images of the same package for sale, and all the captured images of that package are collected in the training set of image data 204.

The training set of image data is communicated to a server, such as the server 120. In the server identifies received image data as corresponding to the same object by performing physical feature extraction using image features manager 210 and providing the physical features to the neural network framework 206. For initial training, the images may include image scan data having decoded indicia data that identifies the object. However, after an initial set of training images, subsequent images used to train neural network 208 may not include any image scan data. Indeed, the neural network framework 206 may be able to identify objects, without any image scan data or indicia data, so long as a sufficient number of training images on an object have been provided.

In training, the imaging stations 202A-204C, although capturing images of the same object, capture those images from different angles and different orientations, under different illumination, and/or under different zoom levels. Indeed, such diversity in the captured image scan data is valuable in developing a more robust trained neural network 208. Therefore, the training set 204 may comprise 100s, to 1000s, to 10000s or more images of an object many with great variation. Furthermore, the training set may grow over time, such that even after the trained neural network 208 has been generated during an initial execution of the training mode, as the same object is captured during retail transactions, for example, the captured images may be sent to the server for adding to the training set 204 and for eventual use by the neural network framework 206 in updating the trained neural network 208.

In the schematic 200, the image features manager 210 at the server identifies physical features, e.g., those listed elsewhere, for each of the image scan data in the training set 204 and generates a labeled image dataset 212 provided to the neural network framework 206. The images of each image scan data may then be labeled with an identification of the physical features identified by the manager 210. In some examples, the server 120 generates the dataset 212 by correlating the identified physical features with identification data obtained from the decoded indicia data. That is, the dataset 212 includes image data labeled with both the identification data identifying the product contained within the object as well as the specific physical features capture by the scanner (3D volume, 2D surface area, etc.). The labeled image dataset 212 is optional. In another examples the images with identified physical features are sent directly to the neural network framework 206. In yet other example, physical feature extraction is performed by the neural network framework 206 itself from the raw images from the imaging scanning stations 202A-202C.

In the illustrated training mode, the neural network framework 206 examines the received image dataset, in particular the identified physical features, and determines a weight for each of those physical features of the object. These weights represent a relative indication of a correlation strength between the physical feature and the identification data of the object. For example, in an exemplary embodiment using a multi-layer classifier algorithm, the neural network framework 206 may determine that projected 3D volume is not highly correlative to predicting whether a captured image is of a box-shaped object. But the neural network framework 206 may determine that a physical feature of a white thinly backed object with red contrasting object on top thereof represent one or a series of physical features that are highly correlative with identifying the object, in this, as packaged meat produce. The neural network determines these weights for each of identified physical feature or for combinations of physical features, as a resulting of using the multiple-layer classifier algorithm. The neural network framework then generates the trained neural network 208 and updates an already existing trained neural network. In the illustrated example, the neural network 208 may be trained for identify anywhere from one to thousands of objects by physical features present in capture images of an object.

In exemplary embodiments, the neural network framework 206 identifies physical features of the object from the images received, whether directly from the imaging stations 202A-202C, directly from the manager 210, labeled or unlabeled. For example, the neural network framework 206 may be configured to segment the received images into an object portion of the image and a non-object portion of the image and then identify physical features from the object portion of the image. That segmentation may include, the neural network performing an edge detecting on the image to identifying the object portion, and providing a bounding box around the object portion to identify separation of the object portion from the non-object portion. The physical features identified by the neural network 206 may be any physical features, including physical features enumerated herein such as the shape of the object, the size of the object, and/or color of the object, as well as, images and text on the object.

The neural network framework 206 may be configured to determine the sensitivity of each object classifier, that is, the likely accuracy of identifying a particular object from the physical features for forming the trained neural network 208. During initial training, the sensitivity will be low, but the sensitivity will increase as more training images are provided, in particular more diverse training images of the object. Toward this end, in exemplary embodiments, the image features manager 210 may be configured to introduce diversity in the image dataset 212 by generating a plurality of renditions of the image of the object, where each rendition is generated by performing an image-based transformation of the image. For example, the manger 210 and/or the neural network framework 206 may be configured perform a diversity assessment on a received image or images to determine additionally diverse images are needed to improve classification sensitivity of the neural network. When the diversity assessment is below a desired image diversity, the manager 210 is instructed to generate one or more renditions of the image of the object.

Example image-based transformations include taking an image of the object and performing is a skew transformation, a rotation transformation, a blurring transformation, a color transformation, darkness/brightness transform, addition of noise, and/or crumble or squeeze transform to generate a second image of that object. The original image and one or more renditions of the image may then be provided to the neural network framework 206.

Figure 3:
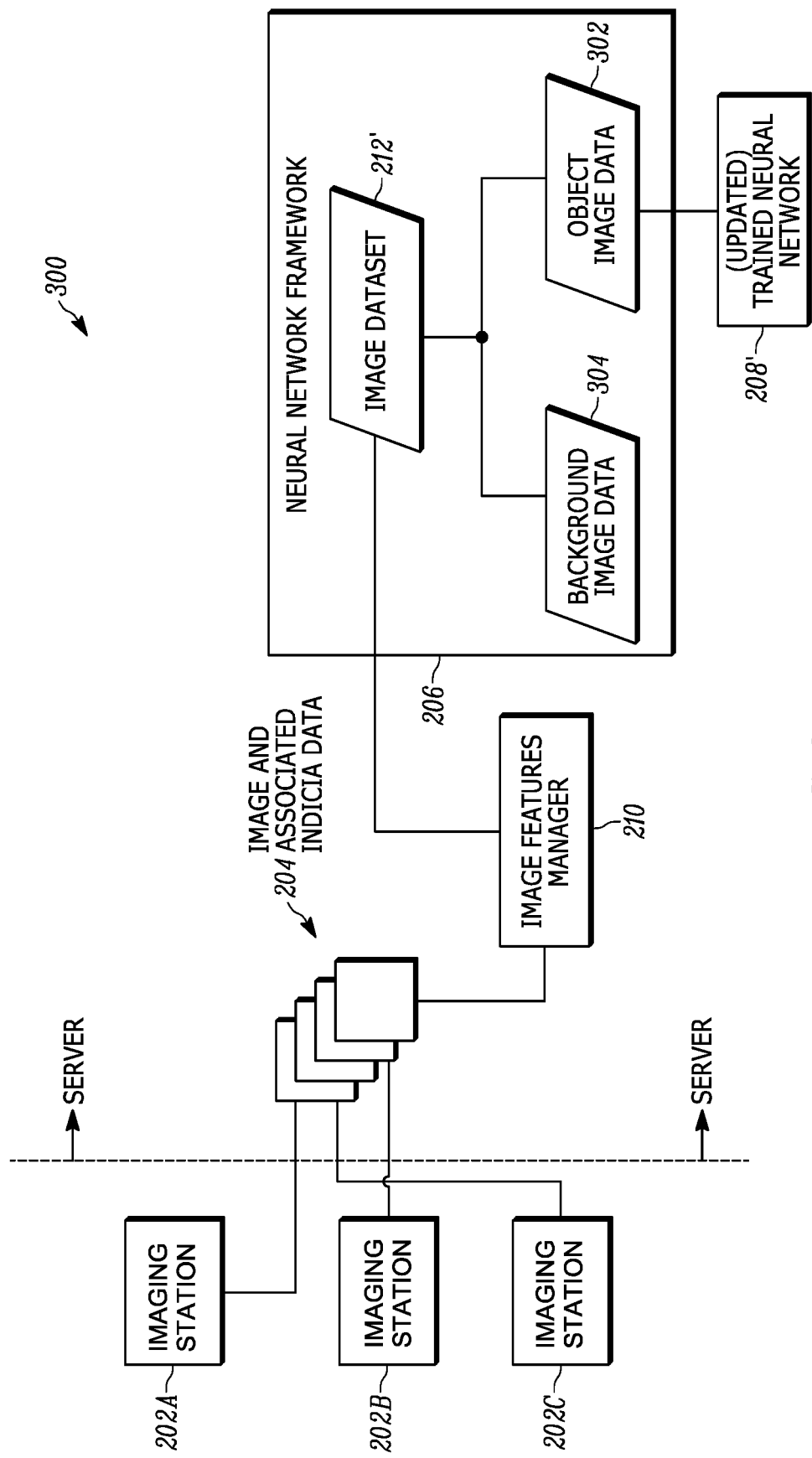
FIG. 3 is a schematic of another example training of a neural network with detection and removal of background image data, in accordance with an example.

FIG. 3 illustrates another schematic 300 with like features to that of FIG. 2, but showing another example implementation of training of a neural network. In the schematic 300, the training data 204 includes images of not only the object, but also where the images capture background of the area around the object where the scanning took place. For example, the captured background may include portions of a point of sale region of a retail facility.

In the example embodiment, the image features manager 210 identifies the physical features in the image scan data and sends the images to the neural network framework 206, which analyzes that image dataset and identifies two types of information in images: object image data 302 and background image data 304 (e.g., a non-object portion of the image). For example, the neural network framework 206 may compare received image dataset 212' to previously received image scan data to identify anomalous features in the received dataset where those anomalous features correspond to background image data capture by the scanning station. Background image data may be particularly present in image scan data captured at the point of sale during a transaction, for example. Background image data may be any image data not identified as object image data. Examples, include portions of the environment around an object, equipment used at a Point-of-Sale station, the hand of scanning personnel, and other near-field and far-field image data. The neural network frameworks herein may be trained to identify such background image data; and, in some example, that training is ongoing during operation of the system thereby allowing the framework to adapt to changes in the environment within which the object is scanned. After identification of the background data 204 and the object image data 302, the neural network framework 206 strips away the former, and uses only the object image data 302 in updating the neural network 208'. Therefore, in this way, the neural network framework 206 may be trained to identify background image data that is not useful in identifying which object is captured by a scanner and remove that information. Indeed, the framework 206 may develop, through supervised or un-supervised techniques, classifiers for identifying background image data as more image scan data is collected over time.

In some examples, while the schematic 300 identifies background image data in images of a particular object or set of objects, the neural network framework 206 develops classifiers for identifying that background image data in any received image scan data, irrespective of what object is captured in that image data.

In some examples, background detection and removal can be performed using image processing techniques instead of a neural network.

Figure 4:
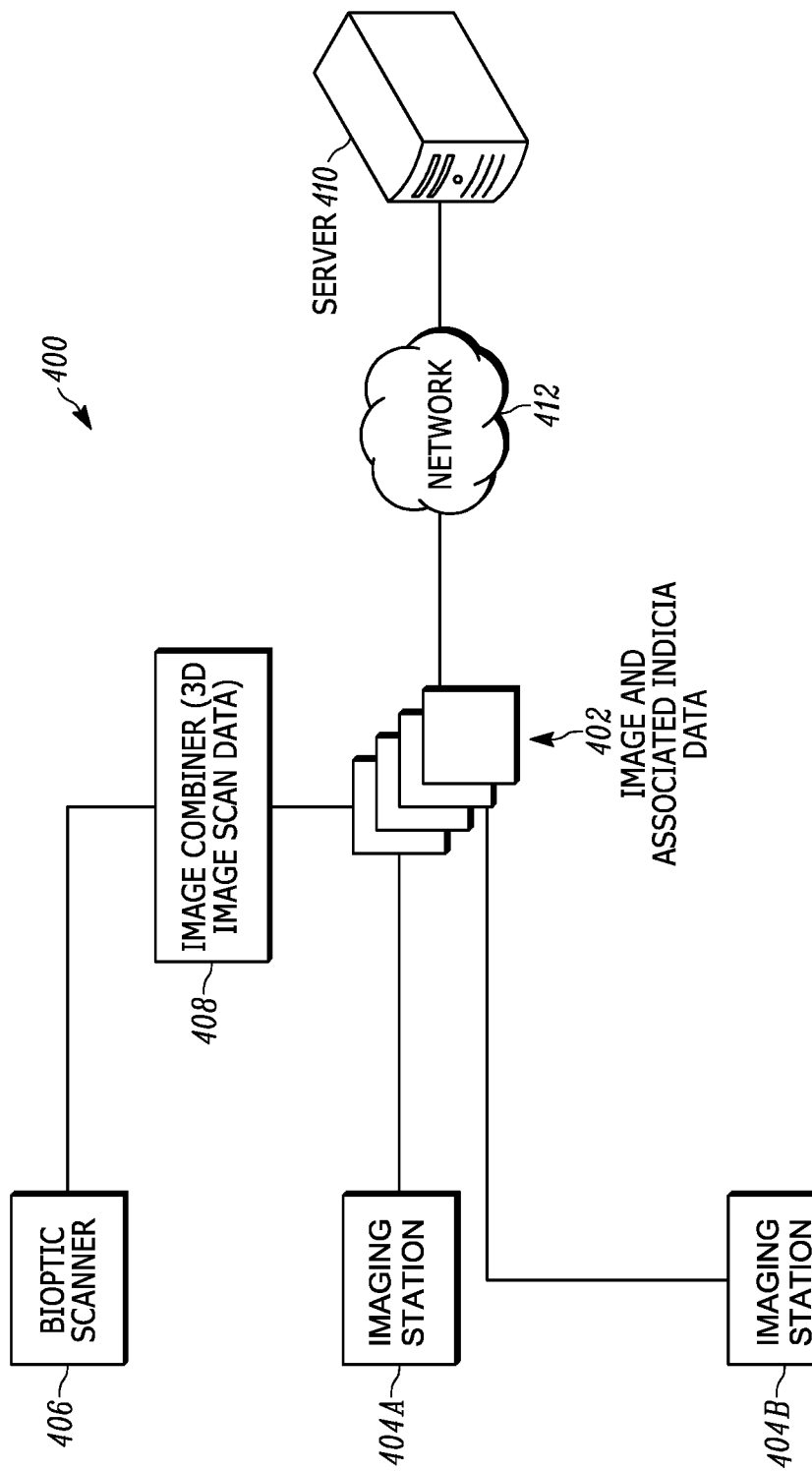
FIG. 4 is a schematic of an example training of a neural network, in accordance with an example.

FIG. 4 illustrates a schematic 400 illustrating that image scan data 402 may contain 2D images from imaging stations 404A and 404B and 3D images and image scan data from a bioptic scanner 406 or other 3D imaging device. In an example, the bioptic scanner 406 captures multiple 2D images of the object and such 2D images are combined in an image combining processor device 408 to form a 3D image scan data. In the illustrated example, each of the imaging station 404A and 404B and the image combining processor device 408 communicate their respective images data to an image processing and anti-spoofing server 410 through network 412. As with the other examples herein the image processing and anti-spoofing server includes neural network framework.

Figure 5:
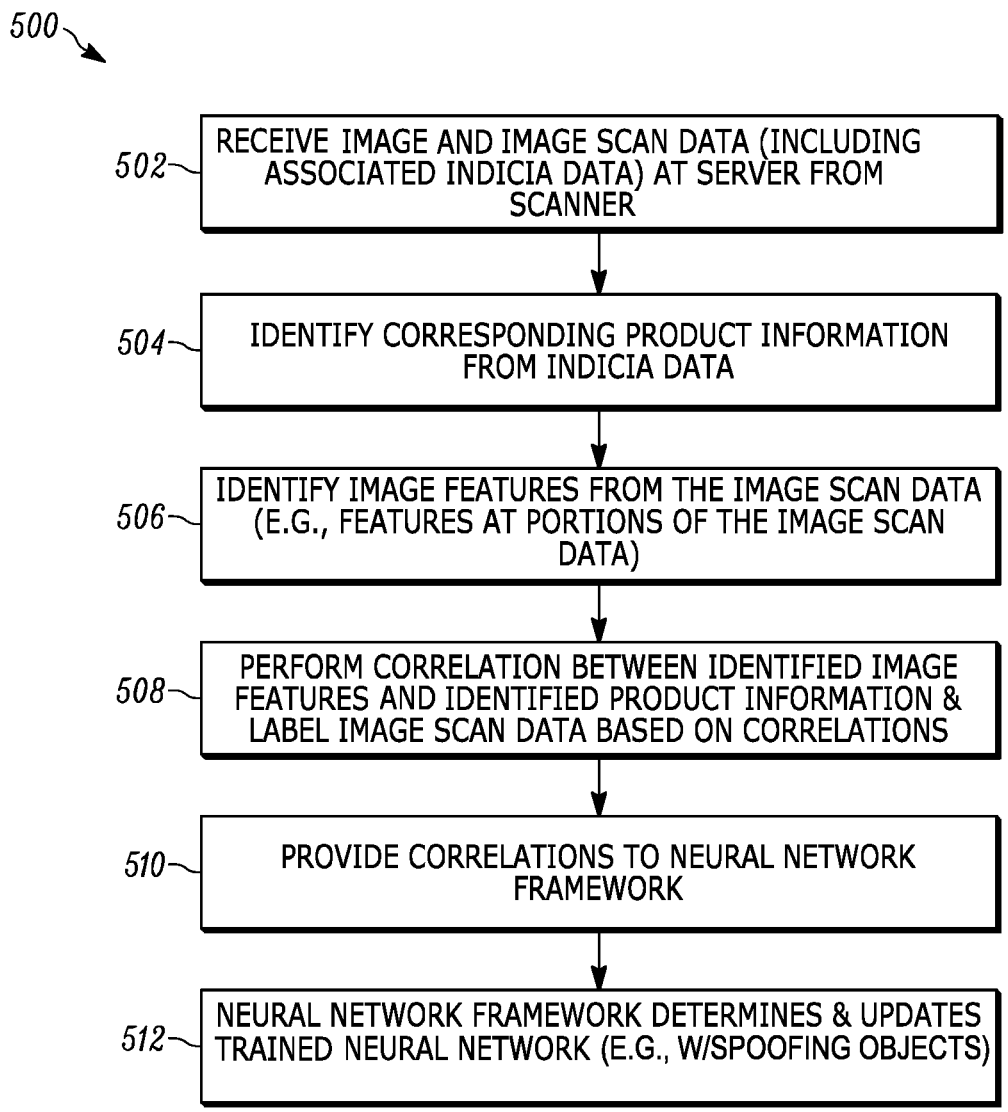
FIG. 5 is a flowchart of a method of training a neural network as may be performed by the system of FIG. 1, in accordance with some embodiments.

FIG. 5 illustrates a flowchart of a neural network training process 500 that may be performed during an initial training or during spoofing or other improper barcode detection at the anti-spoofing system server 120. Image and image scan data of an object is received at a block 502, e.g., at the server 120 from the scanner 104. During initial training, typically, the image scan data includes decoded indicia data corresponding to the object. At a block 504, the decoded indicia data is used to identify a corresponding product associated with that indicia data, e.g., by querying the inventory management controller 124, resulting in product identification data.

At a block 506, the imaging features manager 126 identifies physical features in the received image. In other examples, the scanner or scanning station may determine physical features and send those to the server 120. The features may be identified over the entire image or only over a portion thereof. In some examples, the block 506 identifies physical features corresponding to a previously-determined set physical features. In some examples, the block 506 identifies all identifiable physical features. In some examples, the block 506 is configured to identify features in sequential manner and stops identifying physical features after a predetermined number of physical features have been identified. In some examples, the block 506 may be configured to identify features in an order correspondingly to previously-determined weights for the physical features. In any event, at the block 506, the imaging feature manager 126 may perform edge detection, pattern recognition, shape-based image segmentation, color-based image segmentation, or other imaging processing operations to identify physical features over all or portions of the image. In some examples, the block 506 performs further image processing on these portions to determine physical features of the object, e.g., to reduce image noise.

In the example of produce as the scan object, such as meat contained in a freezer section of a retail store, the block 506 may identify a portion of image, as the portion of the image that includes the meat and excludes the portion of the image that corresponds to a Styrofoam packaging of the meat. In other examples, the block 506 may identify the converse, i.e., the portion of the package, and not the product, for further analysis.

In some examples, the portion of the image is a portion that includes all or at least a part of the indicia. In some examples, the portion of the image includes portions that exclude the indicia, so that authentication that occurs in spoofing detection operates on non-overlapping data. In some examples, the image is a 3D image formed of a plurality of points with three-dimensional data and the portion of the image is either a 2D portion of that 3D image data or a 3D portion thereof.

With the image and image scan data analyzed and the physical features identified, at a block 508, the physical features determined from the image data are correlated to product identification data obtained from the block 504, and that correlated data is sent to a neural network framework implementing block 510.

The neural network framework at block 512 develops (or updates) a neural network, in accordance with the example processes described herein. That is, in some examples, the neural network is configured to examine the physical features in the portion of the image scan data, and over a large training set of images, determine a weighting factor for one or more of those physical features, where the weighting factor is a relative value indicating the likelihood the physical feature can accurately identify the product from other products. For example, for produce, a physical feature, such as the overall size of a packaging or the color of packaging, may be determined to have a higher weighting factor compared to a physical feature such as length of the object or location of the indicia on the object. In some examples, the weighting factor may be determined for a collection of linked physical features, which may result in higher object identification accuracy.

In exemplary embodiments, the block 512 trains the neural network to identify on a subject of objects. For example, as the block 512, the neural network framework may determine if object identification data corresponds to a lower priority object, for example, using an object priority heuristic. If the object identification data corresponds to the lower priority object, then block 512 may exclude training or updating the trained neural network with the physical features extracted from the images.

For example, physical feature extraction may be preferred for more costly items ("bigger ticket" items) in a retail environment, items such as televisions, cellular phones, laptops, cameras, etc. Upon receiving images of such spoofing objects, the neural network framework builds physical features identifying such objects and these physical features may be used to train or update the neural network at block 512.

In another example, however, physical feature extraction may be preferred for lower cost items in a retail environment, in particular items that have barcode indicia typically used for spoofing. Upon receiving images of such spoofing objects, the neural network framework builds physical features identifying such objects and these physical features may be used to train or update the neural network at block 512. That is, in some examples herein, spoofing objects are the commonly spoofed higher priced hidden-barcode item, while in other examples, spoofing objects are the commonly spoofed lower priced barcode item.

In some examples, the training neural network from block 512 includes a characteristic set of physical features of the object, where this characteristic set presents the set of features the neural network has determined are minimally sufficiently predictive of the object. In some examples, this characteristic set may be a set provides object prediction with an accuracy of greater than 60%, greater than 70%, greater than 80%, greater than 90%, greater than 95%, or greater than 99%.

Figure 6:
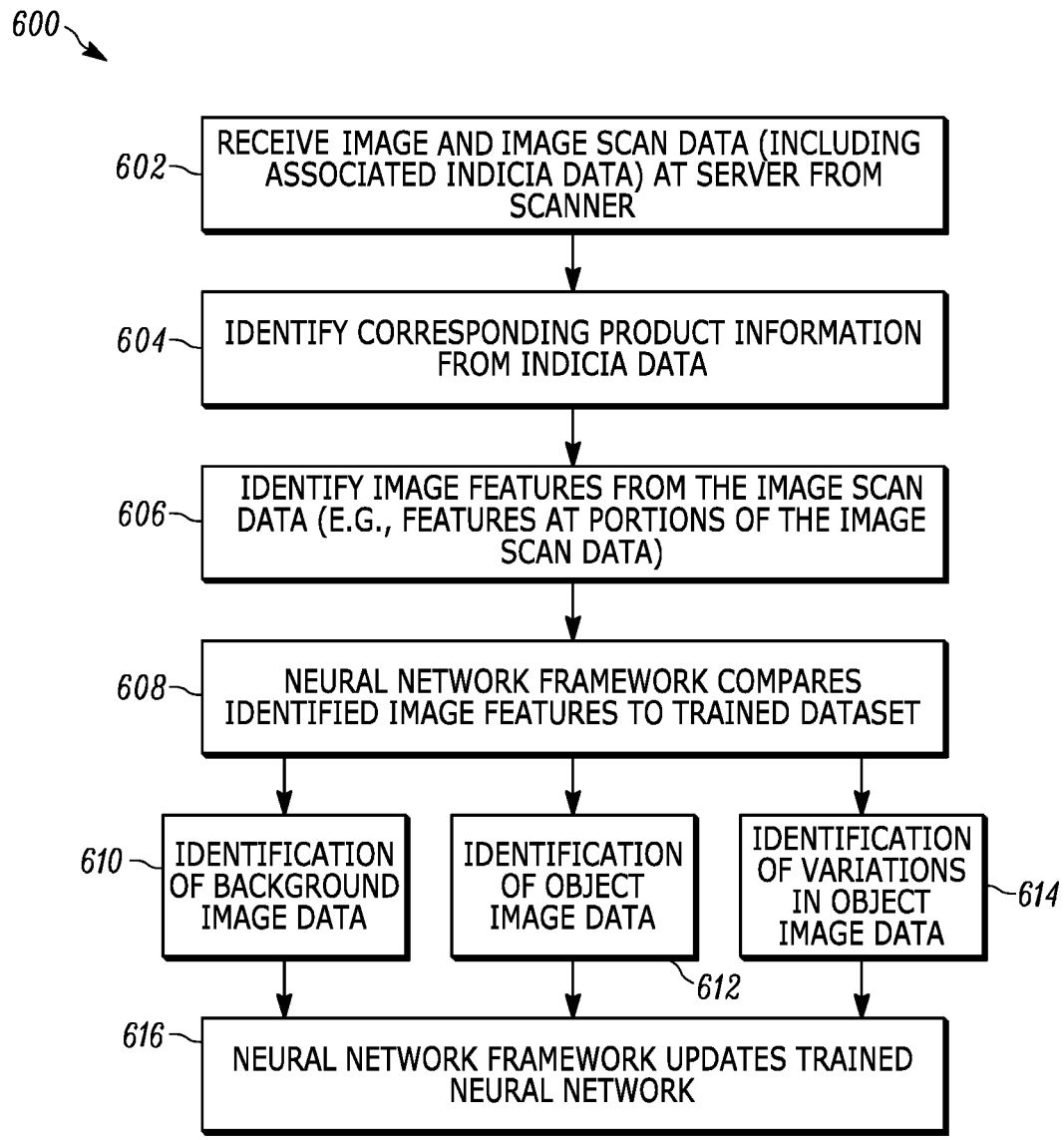
FIG. 6 is a flowchart of another method of training a neural network as may be performed by the system of FIG. 1, in accordance with some embodiments.

FIG. 6 illustrates another example neural network training process 600 that may be performed as a separate training or as may be performed during spoofing or other improper barcode detection at the anti-spoofing system server 120. Image and image scan data is received, product identification data is determined from decoded indicia data, and physical features are identified from the images, at blocks 602, 604, and 606, respectively, and similar to that described for process 500. At a block 608, a neural network framework compares the identified physical features to previously identified image features in a trained data set, for example, applying a multi-layer classification process. From the comparison, the block 608 classifies image features into one of three classes: background image data 610, object image data 612, and variations to object image data 614. The classified image data types are sent to a block 616, where the neural network framework develops (or updates) a neural network, in accordance with the example processes described herein. Further, as with the process 512, the neural network framework of block 616 may only update with physical features of certain subsets of objects, such as spoofing objects.

During spoofing detection or any improper barcode detection process, the server 120 uses the trained neural network in accordance with the techniques herein, to detect from image data when object in the image does not correspond to scanned product barcode data. In an example implementation, the server 120 is able to identify an object from image data and generate a barcode or other object identification corresponding to the object. The generated barcode can then be used to complete a transaction in place of the barcode physically scanned at the Point-of-Sale 100, send an alarm for to the scanning station 102 for an unauthorized transaction at the point of sale 100, or override the transaction and complete a secondary transaction in response to an unauthorized transaction at the point of sale 100.

Figure 7:
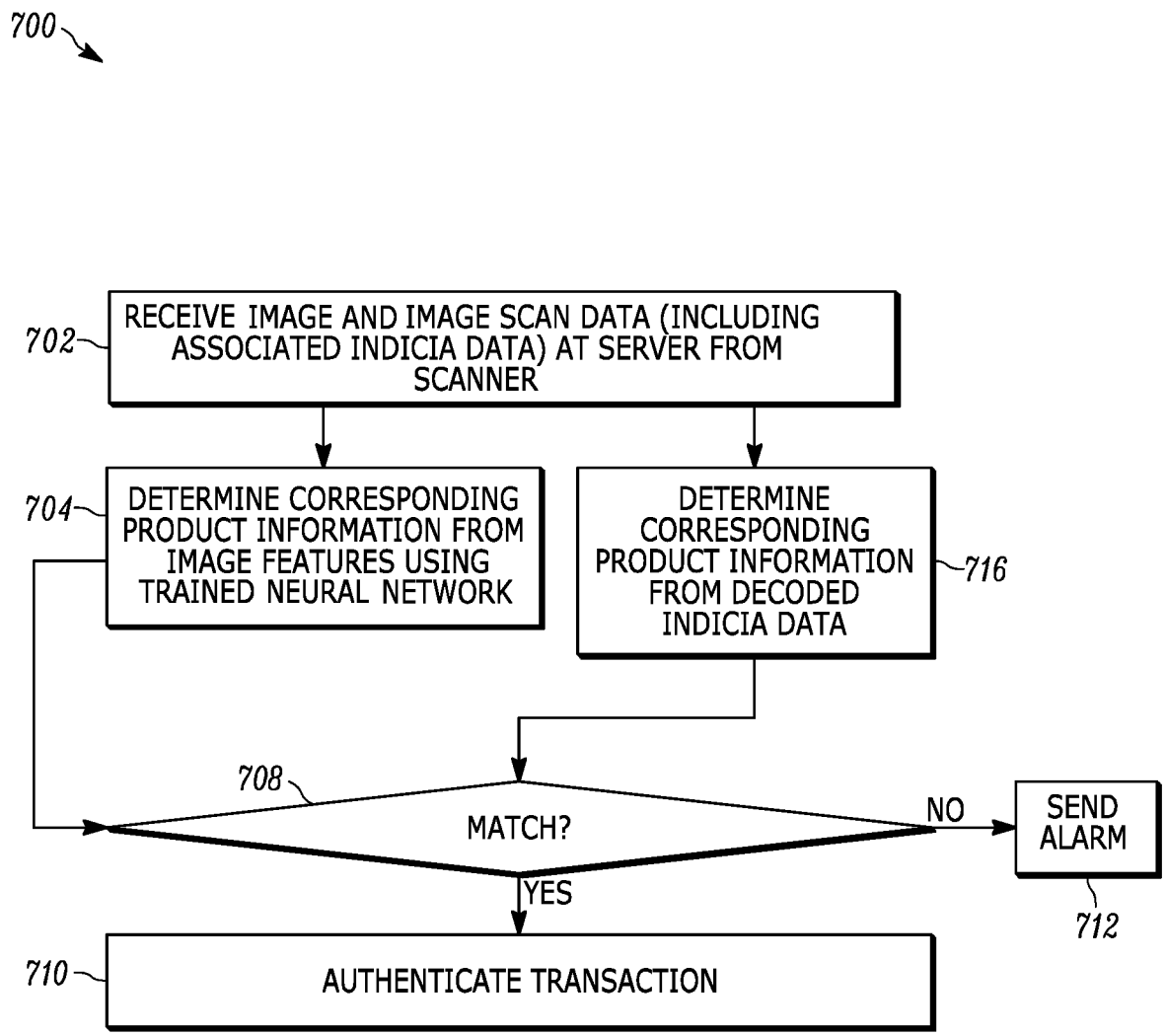
FIG. 7 is a flowchart of a method of detecting a spoofing attempt at the point of sale location of FIG. 1 and generating an alarm, in accordance with some embodiments.

FIG. 7 illustrates an example spoofing detection process 700. An image processing and anti-spoofing server receives image scan data including decode indicia data at block 702. The anti-spoofing server analyzes image data independently from any decoded indicia in the image scan data. In a typical spoofing attempt, a customer or sales representative attempts to replace the indicia, e.g., barcode, for a product with an indicia for a lower priced item, which is then charged to the customer to complete the transaction.

At a block 704, a neural network framework examines received images identifies physical features in the images. In some examples, the server uses a image features manager to identify the physical features. With the features identified, the neural network framework analyzes those physical and determines an object identification data associated with the object based on the physical features. For example, the neural network framework may identify the object the image from these physical features, check the object against an inventory management controller, and determine a barcode for the identified object, where that barcode serves as the corresponding product information.

Separately, decoded indicia data determined from image scan data is sent to a block 706, where the server 120 which separately identifies product information data based on the decoded indicia. The block 706 may generate the barcode for the associated indicia data.

In this way, product identification data is determined from two different data, from image data and without use of indicia data and from decoded indicia data. In a spoofing attempt, the two different data will result in two different identified products.

In the illustrated example, a block 708 determines if the two product identification data match (e.g., if the barcode generated by block 704 matches the barcode from block 706).

In some examples, the block 708 generates a match prediction in the form of a match prediction score indicating a probability that the product information identified from the image matches the product information identified from the decoded indicia data. In some examples, the match prediction is a percentage value.

In some examples, to determine if the match occurs between the product identification data, the neural network framework, analyzing the images, determines a confidence level indication for the object identification data. For example, the confidence level indication may indicate the certainty of the object identification data determined by the trained neural network. When the confidence level indication is in a first range of values, then block 704 may communicate the product information (i.e., object identification data). As such, if a match is determined at the block 708 an authentication signal may be communicated from the server to the scanning station via block 712. In some such examples, when the confidence level indication is in the first range of values, the neural network framework may update the trained neural network with the image(s) received, as discussed elsewhere herein.

When the confidence level indication is in a second range of values indicate a lack of surety in the identified object or indicating that the block 704 was not able to identify any object from the image(s), then the block 710 may communicate to the scanning station a failed authorization signal as the alarm 712.

In either case, if there is no match between the two product identification information, an alarm signal is generated by the server and sent to the scanning station via block 712.

Figure 8:
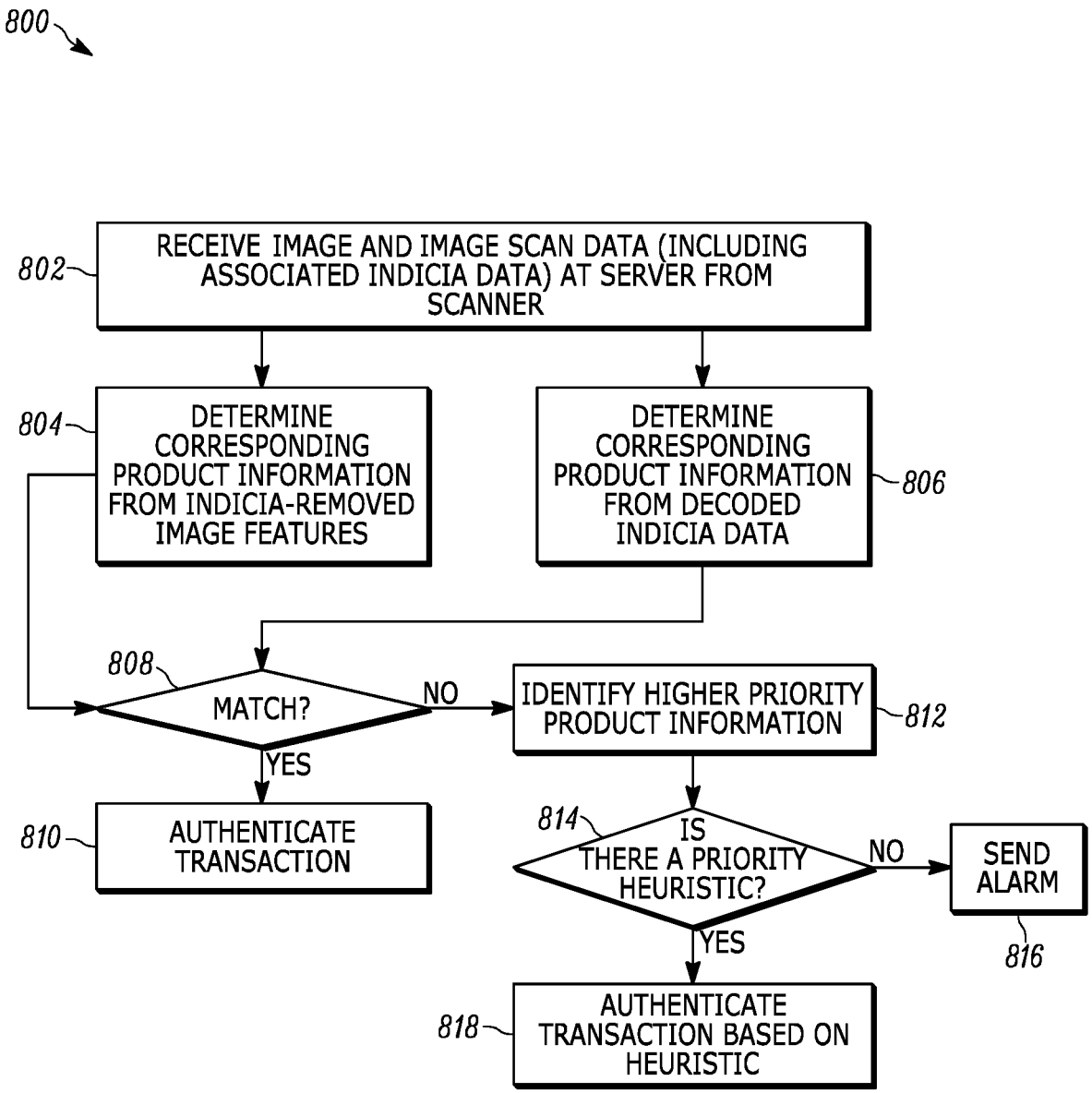
FIG. 8 is a flowchart of a method of detecting a spoofing attempt at the point of sale location of FIG. 1 and overriding and authorizing a secondary transaction, in accordance with some embodiments.

FIG. 8 illustrates another example spoofing detection process 800. Blocks 802, 804, 806, and 808, operate similarly to corresponding blocks in the process 700. At a block 808, an image processing and anti-spoofing server compares the two resulting product identification data and determines if there is a match. If there is a match, the transaction in authenticated and an authentication signal is sent from the server to the scanning station via a block 810.

The process 800 differs from the process 700, however, in that if a match does not occur, then the process 800 resolves the transaction instead of sending an alarm. In the illustrated example, at a block 812, the anti-spoofing server determines for each of the two identified product information data which product information has higher priority between the two. The priority of a product may be determined by accessing an inventory management controller and obtaining specific product data on the product. The priority of a product may be based on the price of a product, where the higher priced product has higher priority than the lower priced product. The priority of a product may be based on other product data, such as the amount of discounting of the price when the product is on sale. The priority may be based on other product data such as amount of remaining inventory on the product, whether the product may be re-shelved, traceability of the product, whether the product is perishable, whether the product is in high demand, a category classification of the product, such as whether the product is an essential household item or essential life sustaining item or household product vs. a non-essential home decor product, retailers margin on the product, traceability of the product (e.g 1. a smart TV that requires geo activation is less likely to be stolen compared to one that does not have activation, 2. An RFID tagged apparel is less likely to be stolen compared to a non-RFID one as item could potentially be still tracked after sale).

Each of these priorities may be determined by applying a priority heuristic (e.g., high priced product wins priority, lower inventory product wins priority, perishable product wins priority). Such priority heuristics may be stored and executed at the server 120, for example. In the process 800, at a block 814, the server determines if a priority heuristic exists, and if one does not, then an ordinary alarm mode is entered and an alarm signal is sent from the server to the scanning station via block 816. For example, some retail store managers may send, over a communication network, an instruction to the anti-spoofing server to disable to priority heuristic so that transactions are not overridden.

The techniques herein may be implemented on neural networks, such as convolutional neural networks that are self-trained to improve over a period of time as the neural network is trained with more images of the object. Further, as described, not all images may be provided to training. In some examples, a subset of images is not given for training. These images may still be used for improper barcode detection to evaluate the accuracy of the classification based predictions of the system. Further, images may be used for training if the images are obtained from certain sources, such as images from store operator manned lanes that trusted. For example, an anti-spoofing server may identify images by encoded labels within the image identifying the imaging source. And the server may be configured to use only images from certain imaging sources for training the neural network.

Further still, by allowing for continual training of the neural network during normal spoofing detection operations, the systems herein are able to learn and adapt to changes in look and feel of objects, such as retail products, e.g., as objects are characterized by different physical features over time despite having the same indicia, barcode, or stock keeping unit (SKU). Of course, the techniques herein can be replicated to different stores or learned information from multiple stores can be combined.

In the illustrated example, when a priority heuristic does exist, at a block 818 the anti-spoofing server applies that priority heuristic, determines which product is to be charged at the point of sale, and then server authenticates the transaction based on that heuristic communicating transaction data, including an identification of the product and the product price to the scanning station for completely the transaction. In some examples, the anti-spoofing sever is send a transaction completion signal to the scanning station for automatically completing the transaction without further input from the customer, sales associate, etc. at the point of sale.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method for improper objection detection, the method comprising:
   receiving, at one or more processors, an image of an object and initial object identification data, the image captured by an image scanner;
   determining if the initial object identification data corresponds to a lower priority object, using an object priority heuristic;
   responsive to the initial object identification data corresponding to the lower priority object, excluding the received image from being provided to a trained neural network; and
   responsive to the initial object identification data not corresponding to the lower priority object, providing the image to the trained neural network for analysis, wherein the analysis includes:
      analyzing, in a trained neural network, physical features of the object and determining an object identification data associated with the object based on the physical features and determining a confidence level indication corresponding to the certainty of the object identification data determined by the trained neural network; and
      when the confidence level indication is in a first range of values, communicating an authorization signal having the object identification data, and when the confidence level indication is in a second range of values, communicating a failed authorization signal.

2. The computer-implemented method of claim 1, further comprising:
   when the confidence level indication is in the first range of values, updating the trained neural network with the image.

3. The computer-implemented method of claim 1, wherein receiving initial object identification data comprises receiving decoded indicia data object from the image and determining the initial object identification data from the decoded indicia data.

4. The computer-implemented method of claim 1, wherein identifying the physical features of the object from the image comprises:
   segmenting the image into the object portion of the image and the non-object portion of the image and identifying the physical features from the object portion of the image.

5. The computer-implemented method of claim 4, wherein the segmenting the image comprises;
   performing an edge detecting on the image to identifying the object portion; and
   providing a bounding box around the object portion to identify separation of the object portion from the non-object portion.

6. The computer-implemented method of claim 1, wherein the physical features comprise shape of the object, size of the object, and/or color of the object, images on the object, and text on the object.

7. The computer-implemented method of claim 1, further comprising:
   receiving, at the one or more processors, a plurality of images of an object captured by the image scanner or by a plurality of image scanners, wherein at least some of the plurality of images capture the object at different orientations, under different illumination, and/or under different zoom levels; and
   identifying, at the one or more processors, physical features of the object in each of the plurality of images and providing the images with the identified physical features to the trained neural network.

8. The computer-implemented method of claim 7, wherein the plurality of images are each captured from the same image scanner.

9. The computer-implemented method of claim 7, wherein the plurality of images are each captured by a bioptic scanner.

10. The computer-implemented method of claim 7, wherein the plurality of images are each frames of color video captured by the bioptic scanner.

11. The computer-implemented method of claim 7, wherein the plurality of images are each captured from a different image scanner.

12. The computer-implemented method of claim 1, further comprising:
   generating, at the one or more processors, a plurality of renditions of the image of the object, each rendition being an image-based transformation of the image; and
   identifying, at the one or more processors, physical features of the object in each of the renditions of the image and providing the renditions with the identified physical features to the trained neural network.

13. The computer-implemented method of claim 12, wherein image-based transformation is a skew transformation, a rotation transformation, a blurring transformation, a color transformation, darkness/brightness transform, addition of noise, and/or crumble or squeeze transform.

14. The computer-implemented method of claim 1, further comprising:
   analyzing, at the one or more processors, the identified physical features of the object from the image and determining a diversity assessment of the image; and
   when the diversity assessment is below a desired image diversity, generating, at the one or more processors, one or more renditions of the image of the object, where each rendition is generated by applying a different image-based transformation to the image; and
   identifying, at the one or more processors, physical features of the object in each rendition of the image and providing the one or more renditions with the identified physical features to the trained neural network.

15. The computer-implemented method of claim 14, wherein image-based transformation is a skew transformation, a rotation transformation, a blurring transformation, a color transformation, darkness/brightness transform, addition of noise, and/or crumble or squeeze transform.

16. The computer-implemented method of claim 1, wherein the trained neural network is a convolutional neural network.

17. A computer-implemented method for improper objection detection, the method comprising:
- receiving, at one or more processors, an image of an object, the image captured by an image scanner;
- analyzing, in a trained neural network, physical features of the object and determining an object identification data associated with the object based on the physical features and determining a confidence level indication corresponding to the certainty of the object identification data determined by the trained neural network;
- when the confidence level indication is in a first range of values, communicating an authorization signal having the object identification data, and when the confidence level indication is in a second range of values, communicating a failed authorization signal;
- analyzing, at the one or more processors, the identified physical features of the object from the image and determining a diversity assessment of the image;
- when the diversity assessment is below a desired image diversity, generating, at the one or more processors, one or more renditions of the image of the object, where each rendition is generated by applying a different image-based transformation to the image; and
- identifying, at the one or more processors, physical features of the object in each rendition of the image and providing the one or more renditions with the identified physical features to the trained neural network.

* * * * *